United States Patent
Detty

[11] Patent Number: 5,871,458
[45] Date of Patent: Feb. 16, 1999

[54] EQUINE ANKLE BRACE SYSTEM

[76] Inventor: Gerald D. Detty, 3911 W. Lambert La., Tucson, Ariz. 85742

[21] Appl. No.: 965,553

[22] Filed: Nov. 6, 1997

[51] Int. Cl.[6] .......................................................... A61F 5/00
[52] U.S. Cl. .................................. 602/27; 54/82; 602/62; 607/108
[58] Field of Search ........................... 602/23, 27, 61–65; 54/82; 607/108, 111, 114; 2/16, 22, 24

[56] References Cited

U.S. PATENT DOCUMENTS

| | | | |
|---|---|---|---|
| 2,512,925 | 12/1950 | Eggeman . | |
| 2,937,487 | 2/1960 | Dever . | |
| 3,193,984 | 7/1965 | Schubert . | |
| 4,099,269 | 7/1978 | Porner . | |
| 4,342,185 | 8/1982 | Pellow | 54/82 |
| 4,538,602 | 9/1985 | Shapiro . | |
| 4,834,079 | 5/1989 | Benckhuijsen | 54/82 X |
| 5,115,627 | 5/1992 | Scott . | |
| 5,152,285 | 10/1992 | Gnegy . | |
| 5,226,191 | 7/1993 | Mitchell | 2/24 |
| 5,363,632 | 11/1994 | Armato . | |
| 5,366,439 | 11/1994 | Peters | 602/27 |
| 5,393,303 | 2/1995 | Shiono | 602/27 |
| 5,579,627 | 12/1996 | Vogt . | |
| 5,676,642 | 10/1997 | Peters | 602/27 |

*Primary Examiner*—Linda C. M. Dvorak

*Attorney, Agent, or Firm*—Caesar, Rivise, Bernstein, Cohen & Pokotilow, Ltd.

[57] ABSTRACT

An equine ankle brace system. The system includes a brace and at least one treatment insert arranged to be releasably secured within the brace. The brace comprises a panel of a resilient thermally insulating, heat retaining, e.g., neoprene rubber, material, having a cup-shaped bottom portion for enabling the panel to be wrapped around the ankle to readily conform to it. The panel has an inner surface and an outer surface, a pair of front marginal edges and three groups of releasably securable straps coupled to the panel to enable the panel to be wrapped about the horse's ankle in close conformance therewith and to be held in place thereon against accidental disconnection. One group of straps is secured adjacent one of the front edges of the panel while the other group of straps is secured adjacent the other of the front edges and is arranged to overlap the one group of straps. The third group is connected to the panel adjacent the cup shaped portion to provide fetlock support. The system also includes plural treatment inserts, each one being of a different material depending upon the desired result to be provided thereby. Each embodiment the treatment insert comprises a material arranged to produce a beneficial effect, e.g., shock absorption, on the horse's ankle and has a releasable securable connector, e.g., one component of a hook and loop fastening system, fixedly secured to it to releasably engage a cooperating connector secured to the panel to mount the insert on the brace and to hold it in place.

25 Claims, 4 Drawing Sheets

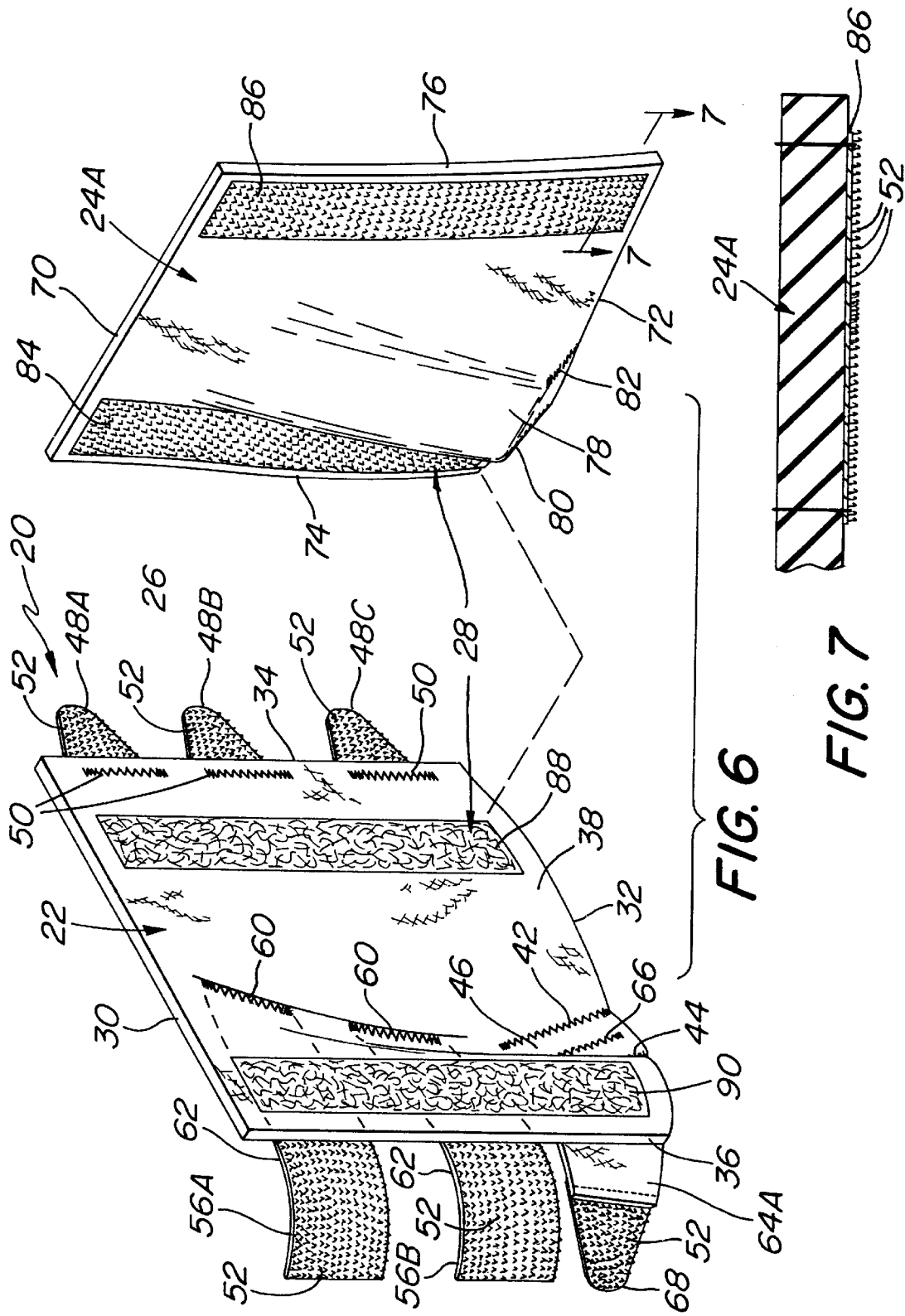

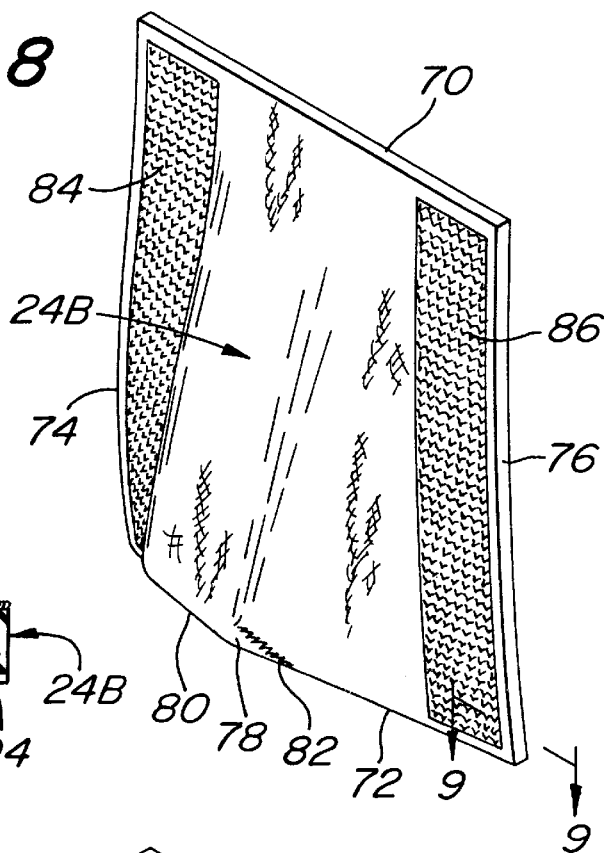
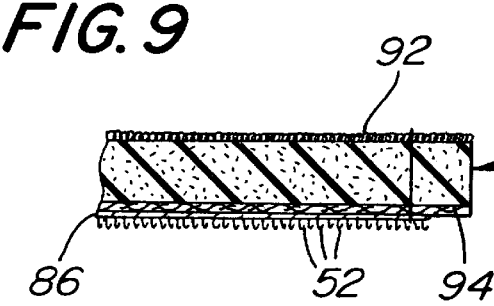
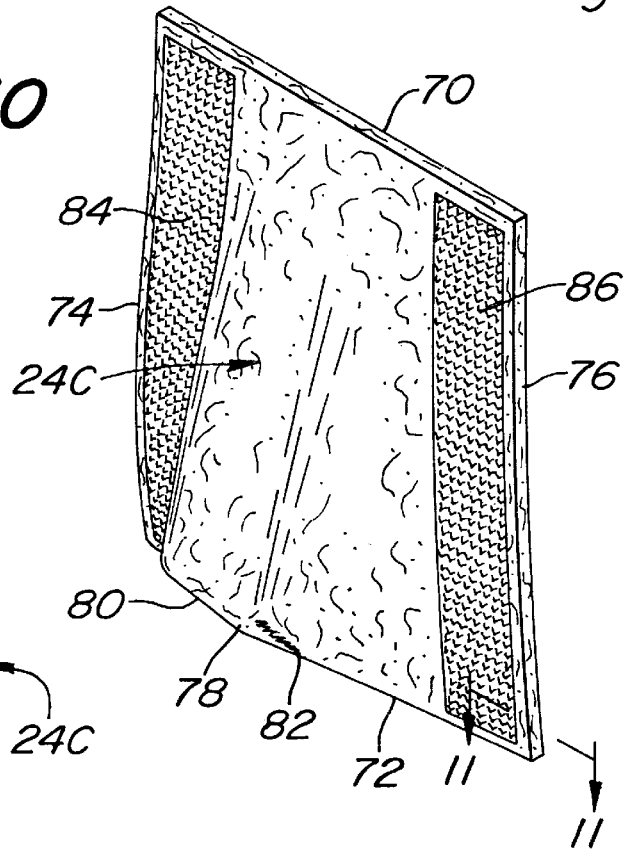
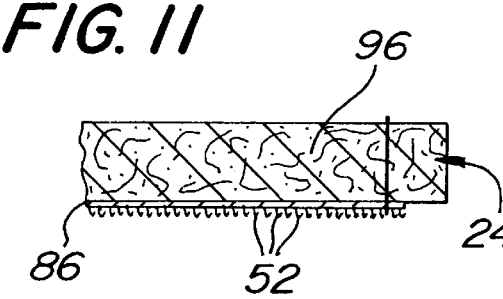

EQUINE ANKLE BRACE SYSTEM

BACKGROUND OF THE INVENTION

This invention relates generally to ankle braces and more particularly to ankle braces for horses.

Horses, particularly those involved in athletic activities, such as running, jumping, etc., frequently suffer from a variety of ailments to their ankles and the muscles and tendons associated therewith. These ailments can vary from simple tendonitis to severe joint degeneration.

Several United States Letters Patents have been issued disclosing various braces for use on the ankles of horses to provide bracing and/or other beneficial effects to the ankle and associated anatomical structures. Those patents are: U.S. Pat. No. 2,512,925(Eggeman), 2,937,487 (Dever), 3,193,984 (Schubert), 4,099,269 (Porner), 4,538,602 (Shapiro), 5,115,627 (Scott), 5,152,285 (Gnegy), 5,363,632 (Armato) and 5,579,627 (Vogt). Moreover, the braces of the Scott and Vogt patents are commercially available.

While the foregoing prior art equine ankle braces may be generally suitable for their intended purposes, they never the less leave something to be desired from one or more of the standpoints of adaptability for various applications, effectiveness, ease of mounting and dismounting, ease of use, ease of adjustment, resistance to accidental disconnection or loosening, and customization of the brace for a particular therapy desired.

OBJECTS OF THE INVENTION

Accordingly, it is a general object of this invention to provide an ankle brace system for horses which overcomes the disadvantages of the prior art.

It is a further object of this invention to provide an ankle brace system for horses which provides support to the ankle and includes means which enables the provision of a particular modality of therapy to be applied to the ankle while the brace system is in place.

It is a further object of this invention to provide an ankle brace system for horses which includes a brace arranged to wrapped about the ankle of the horse and to be readily configured for a particular type of therapy by the selection of an appropriate insert for the brace.

It is a further object of this invention to provide an ankle brace system for horses which provides a contoured fit to the horse's ankle.

It is a further object of this invention to provide an ankle brace system for horses which is easy to apply and remove.

It is a further object of this invention to provide an ankle brace system for horses which, once in place on the ankle of the horse, is resistant to accidental disconnection or loosening.

SUMMARY OF THE INVENTION

These and other objects of this invention are achieved by providing an equine ankle brace system. The system comprises a brace arranged to be wrapped about the ankle of a horse, and at least one treatment insert arranged to be releasably secured within the brace.

The brace is in the form of a panel of a resilient thermally insulating, heat retaining material and has a cup-shaped bottom portion. This portion is configured to enable the panel to conform to the horse's ankle and contiguous portions of the horse's lower leg, e.g., the fetlock area. The panel also includes an inner surface, an outer surface and releasably securable strap means coupled to the panel. The releasably securable strap means enables the panel to be wrapped about the horse's ankle to conform to the horse's ankle and contiguous portions of the leg and to be held in position thereon. The brace also includes a first releasable securement means, e.g., one component of a hook and loop (VELCRO®) fastening system, fixed to portions of the inner surface of the panel.

The system includes at least one, and preferably plural, different treatment inserts. Each insert is arranged to produce a different beneficial effect on the ankle of the horse, dependent on the type of insert employed. To that end, each insert includes or is formed of a particular material, e.g., a shock absorbing material, an air-pervious material, a thermally insulative heat retentive material, a cooling material, etc., which is arranged to produce a desired beneficial effect, e.g., shock absorption, wound healing promotion, heat application, cold application, etc., respectively on the horse's ankle and contiguous anatomical structure(s). Each treatment insert includes second releasable securement means, e.g., the other component a hook and loop (VELCRO®) fastening system, fixedly secured to it to enable it to be releasably secured to cooperating means in the brace for location between the brace and the horse's ankle to hold it in place resistant to occidental displacement.

In accordance with one preferred aspect of this invention the panel forming the brace has a pair of front edges and the releasably securable strap means comprises two groups of mounting straps located adjacent those edges. In particular, one group of mounting strap is secured to the panel forming the brace adjacent one of the front edges and the other group of mounting straps is secured to the panel adjacent the other of its front edges. Moreover, one of the groups of straps is arranged to overlap the other group of straps to prevent accidental loosening of the straps of that other group and thereby securely hold the brace in place against accidental disconnection even under adverse conditions such as wet or muddy environments.

In accordance with another preferred aspect of this invention the releasably securable strap means includes a third group, e.g., a pair of straps secured to the panel forming the cup shaped lower portion (i.e., the fetlock receiving pocket). This group of straps are arranged to be extended upward and releasably secured to the panel adjacent the front of the wrap to provide upward support for the horse's fetlock.

DESCRIPTION OF THE DRAWING

Other objects and many attendant features of this invention will become readily appreciated as the same becomes better understood by reference to the following detailed description when considered in connection with the accompanying drawing wherein:

FIG. 6 is an exploded isometric view showing the brace system with one type of inserts, i.e., the insert of FIG. 1, used with the brace of the system;

FIG. 7 is an enlarged sectional view taken along line 7—7 of FIG. 6;

FIG. 8 is a reduced isometric view of an alternative insert type for use in the brace system of this invention;

FIG. 9 is an enlarged sectional view taken along line 9—9 of FIG. 8;

FIG. 10 is a reduced isometric view of yet another alternative type of insert for use with the brace system of this invention; and FIG. 11 is an enlarged sectional view taken along line 11—11 of FIG. 10.

DETAILED DESCRIPTION OF THE PREFERRED EMBODIMENTS

Figure 1:
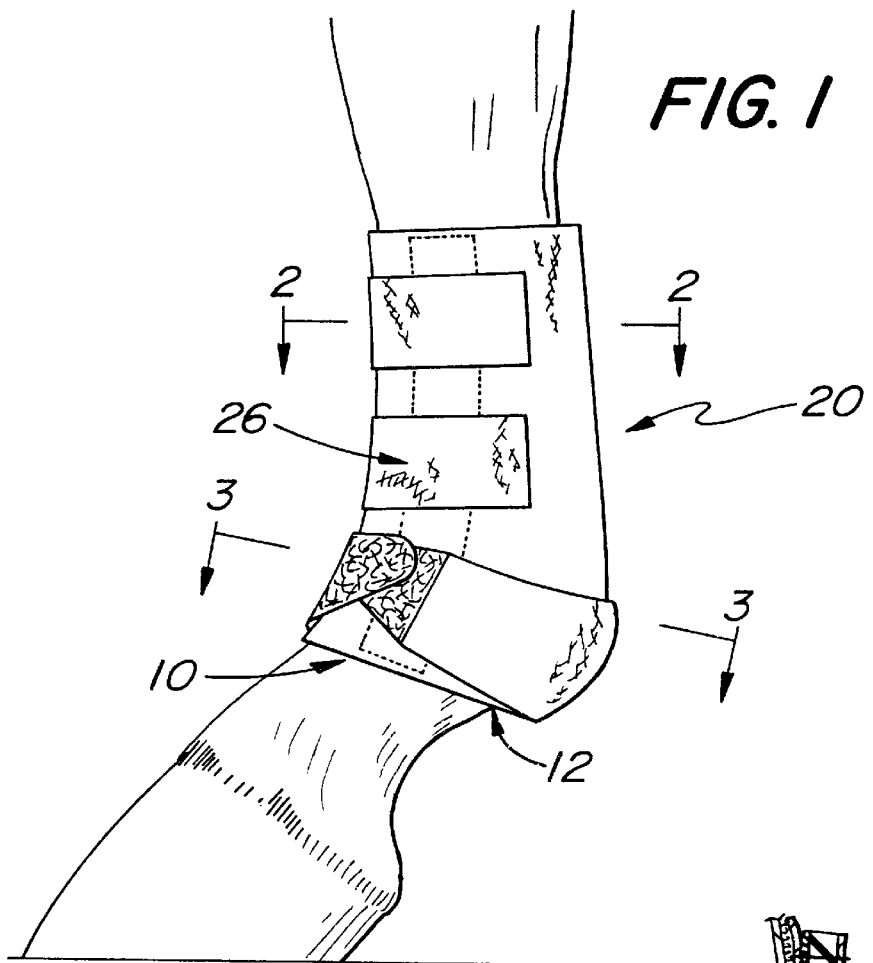
FIG. 1 is a side elevational view of an equine ankle brace system constructed in accordance with the subject invention and shown in place on a left ankle of a horse when viewed from the lateral (outside) side of the leg.
Figure 4:
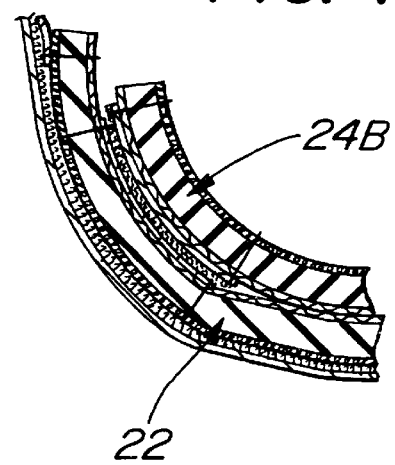
FIG. 4 is an enlarged sectional view of the brace system within the area bounded by the oval designated as "FIG. 4" in FIG. 2, but showing an alternative type of insert of the system of this invention mounted within the brace of the system.
Figure 5:
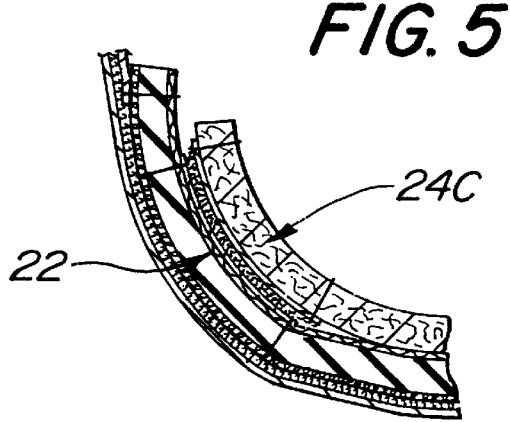
FIG. 5 is an enlarged sectional view of the brace within the area bounded by the oval designated as "FIG. 5" in FIG. 2, but showing yet another alternative type of insert of the system of this invention mounted within the brace of the system.

Referring now to the drawing where like reference numerals refer to like parts there is shown at 20 in FIG. 1 a brace system constructed in accordance with this invention for use on an ankle 10 of a horse, only a portion of which is shown. The brace system 20 basically comprises a support brace 22 in the form of a panel of neoprene rubber (or some other good thermally insulative, stretchable material) arranged to be wrapped around the horse's ankle and at least one treatment insert, e.g., one of the inserts 24A, 24B, or 24C (FIGS. 6, 8, and 10) for mounting within the brace. As will be appreciated from the discussion to follow, the brace 22 and each of the inserts 24A–24C are constructed so as to be used on the ankles of only one side of the horse. Thus, in accordance with this invention there is a "right" side system for use on either right side ankles, and a mirror image "left" side system for use on either left side ankles.

The brace 22 is arranged so that it can be mounted quickly and easily on the horse's ankle and in good close conformance therewith. Thus, as will be described later, the brace includes a cup-shaped portion which, in cooperation with the stretchable nature of the neoprene, enables the brace to closely conform to the ankle and adjacent equine anatomy when it is wrapped about the ankle and secured in place. The cup shaped portion defines a pocket or recess for accommodating the horse's fetlock 12. The securement of the brace on the ankle is achieved through the use of readily adjustable securement means 26, also to be described later. Thus, when the brace 22 is in place it provides excellent support for the ankle, irrespective variations in the size or shape of the horse's ankle.

As mentioned above, the brace 22 is preferably formed of neoprene rubber or some other good thermally insulative stretchable material since such materials will effectively hold in the horse's body heat. This factor enables the brace system to increase blood circulation through the affected body part (e.g., ankle and contiguous structure), thereby helping prevent stiffness and soreness by keeping the affected tissues warm and allowing for gradual cool-down. The use of neoprene or other similar materials to form the brace also allows for a quicker warm-up to avoid overstretching muscles and tendons and concomitant "microtears" in such tissue which could occur without an adequate warm-up. Another advantage of neoprene or other similar materials for the brace is that since such materials can stretch virtually omnidirectionally, the brace when wrapped about the ankle will apply a uniform compression thereto. While neoprene is a particularly suitable material for the equine bracing system of this invention, it must be reiterated, that other good thermally insulative, heat retaining, compression enhancing materials can be used in lieu of neoprene.

Each of the inserts 24A–24C of the system 20 serves to provide additional functionality for the brace 22 by providing some characteristic or attribute not inherent in or provided by the brace 22 itself. For example, in a preferred embodiment of the system 20 of the invention shown herein there are three different therapy-inducing inserts 24A, 24B, and 24C mentioned heretofore. The insert 24A, which is best seen in FIG. 6, is arranged to enhance the shock absorption characteristics of the brace 22. The system 20 with that insert is particularly suitable for use in lieu of a conventional "shipping boot" for transporting, e.g., trailering the horse. In such application, in addition to providing support and warmth to the ankle, the brace 24A with the insert 24 serves to prevent injury to the ankle or to protect an injured ankle from further injury which could result from impact to the ankle. The insert 24B, which is best seen in FIG. 8, is arranged to increase the heat retention properties of the brace 22, thereby promoting healing. The brace system 20 with the insert 24B has particular utility as a training aid to keep the ankle warm and limber. The insert 24C, which is best seen in FIG. 10, is arranged to enable some air to flow to the ankle between it and the brace 22, thereby rendering the brace system 20 using the insert 24C, particularly suitable for injury rehabilitation wherein the ankle has a wound which could benefit from airflow while being supported. The insert 24C also provides some wicking or moisture absorption properties which may be useful for various applications.

It must be pointed out at this juncture that these three therapeutic inserts 24A–24C are merely exemplary of many types of inserts suitable for use in this system to provide some type of treatment or therapy to the ankle. For example, an insert similar in size and shape to any of the inserts 24A–24C can be formed of any suitable material or can be provided with a pocket or some other means to hold ice or a reusable cold application pack within the brace 22. The brace system employing such a cold-applying insert may be particularly suitable for treating a bruise, tendonitis or some other injury or condition wherein swelling is to be avoided or reduced. Moreover, the brace 22 of that system will not only provide support but also uniform compression by virtue of its omni-directional stretch characteristics.

In order to attach or mount each of the inserts 24A–24C to the brace 22 so that the particular insert selected is held in place at its desired position within the brace, the system 20 includes releasably securable attachment means 28 (FIG. 6). This means will be described later. Suffice it for now to state that that means 28 includes cooperating components which form a portion of the brace 22 itself and a portion of each of the inserts 24A–24C.

Figure 2:
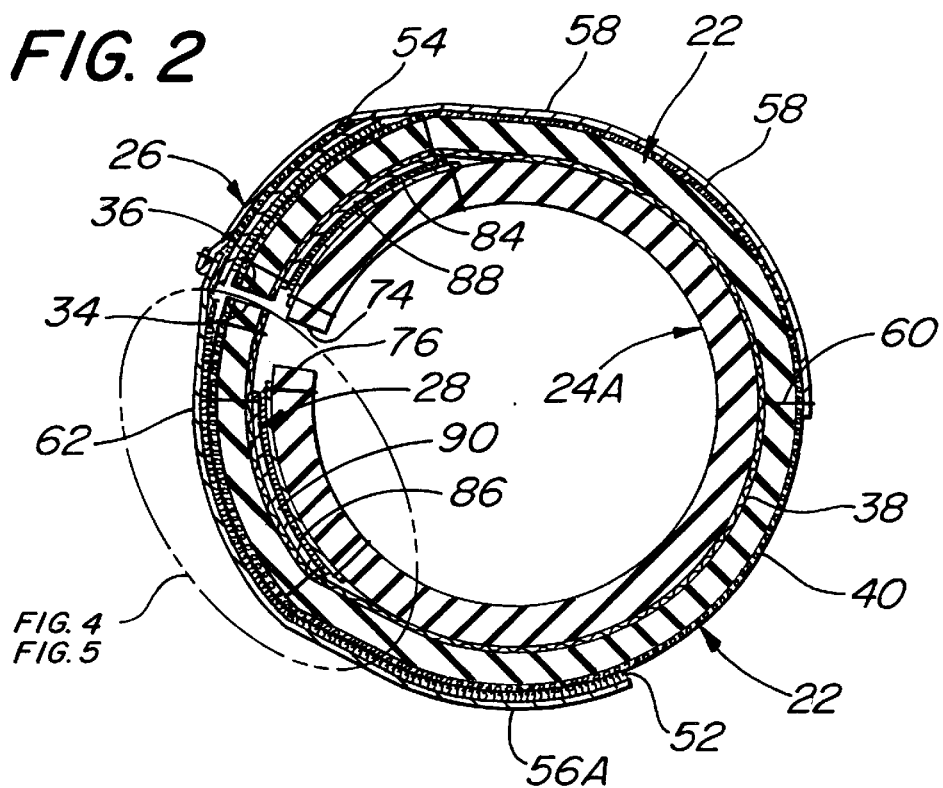
FIG. 2 is an enlarged sectional view taken along line 2—2 of FIG. 1 and showing the brace system with one type of an insert mounted within the wrap of the system.

As shown clearly in FIG. 6, the brace 22 basically comprises a blank or sheet starting out as a generally rectangular shape having a top edge 30 a bottom edge 32, a pair of vertical side edges 34 and 36. The panel includes an inner surface 38 and an outer surface 40 (FIG. 2). Each of the surfaces 38 and 40 of the panel is in the form of a fabric coating or covering. In particular, the outer surface 40 of the panel comprises a plush type fabric fixedly secured, e.g., glued, to the neoprene core whereas the inner surface 38 comprises a smooth fabric fixedly secured, e.g., glued, to the core. A pair of darts 42 and 44 are provided in the panel adjacent the lower edge 32 and are stitched closed to form a cup shaped portion 46 defining a pocket or recess for accommodation of the horse's fetlock. The darts 42 and 44 are located laterally of the vertical midline of the panel so that the cup shaped portion 46 is located closer to the side edge 36 than to the side edge 34 (as noted earlier there is a right side brace system and a left side brace system).

The panel forming the brace 22 is arranged to be wrapped around the ankle of the horse so that the two side edges 34 and 36 are oriented vertical and located on the anterior (front) portion of the horse's ankle 10 and lower leg, and with the horse's fetlock 12 located within the cup shaped recess 46 as shown in FIG. 1.

The releasable securable means 26 for mounting the brace 22 on the horse's ankle 10 basically comprises three groups of releasably securable straps. The first group of straps is in the form of three generally triangular shaped tabs 48A, 48B, and 48C which are each fixedly secured, e.g., sewn by stitch lines 50, to the outer surface 40 of the panel 22 adjacent the edge 34 so that the tapered free end of each tab extends beyond the margin of the edge 34. The inner surface of each of the tabs 48A–48C is in the form of a multitude of small hook-like projections 52 which are arranged to releasably engage the plush fabric outer surface 40 of the panel contiguous with the opposite marginal edge 36. The outer surface of each of the tabs 48A–48C is in the form of a plush or multiloop fabric 54. The feature enables other straps (to be described later) of the releasably securable means 26 to be releasably secured to the outer surface of the tabs 48A–48C and the contiguous outer surface fabric 40 of the brace 22. In accordance with the preferred embodiment of this invention, each of the tabs 48A–48C of the type sold by Velcro Corporation, under the trademark VELTAB.

The releasable, securable mounting means 26 includes a second group of straps. This group is composed of a pair of straps 56A and 56B (FIG. 6). Each of the straps 56A and 56B is an elongated member having a proximal portion 58 formed of an elastic fabric, e.g., Lycra, which is fixedly secured, e.g., sewn by stitch line 60, onto the outer surface 40 of the panel 22 from approximately the vertical mid-line of the panel. The elastic strap portion 58 terminates in a distal portion 62 forming the free end of the strap. The distal portion 62 is in the form of a flexible strip of a multi-hook component of a hook and loop fastening system, e.g., a Velcro® fastening system. The portion 62 is sewn onto the end of portion 58 and includes an inner surface having a multitude of hooks 52 thereon.

The strap 56A and 56B are arranged to be stretched over the tabs 48A–48C after those tabs are secured, as described earlier, to hold the tabs in place and to provide additional securement for the brace 22. To that end each strap 56A and 56B is arranged to be pulled over the area contiguous with the brace's adjacent vertical edges 34 and 36 so that the hooks 52 on the inner surface of the distal end portion 62 of the strap engages the plush outer surface on the brace adjacent the opposite vertical edge, from which it extended. Since the entire outer surface 40 of the brace 22 is plush, the multitude of hooks 52 on the undersurface of the strap portion 62 of strap 56A can be releasably secured at any place on that outer surface. Moreover, the portions of the strap 56A with its multi-hooks may also engage the plush outer surface of the upper most of the tabs, i.e., tab 48A, projecting from side 34 of the panel.

The other strap 56B of the second pair of straps is constructed identically and is arranged to overlie the middle tab 48B to releasably engage its plush outer surface while also engaging the plush outer surface of the panel adjacent thereto. Thus, when the three projecting tabs are secured in place and then the two straps are extended over them and secured in place, the brace will be held in place on the horse's ankle by the straps 56A and 56B overlapping the tabs 48A–48C. The overlapping straps overlooks the tabs to assure positive closure of the brace so that it is resistant to accidental opening even under wet, muddy or other adverse conditions which may tend to loosen a conventional hook and loop fastening system. Nevertheless, the brace can be readily removed by merely pulling the straps 56A and 56B off of the plush surfaces to which they are releasably secured and then pulling the tabs 48A–48C off of the plush surface to which the tabs are releasably secured.

The releasable, securable mounting means 26 includes a third group, i.e., a pair, of straps 64A and 64B. These straps are formed by a single web of fabric-covered-neoprene, like that forming the panel of the brace 22. The web is sewn at 66 at its midpoint to the heel of the brace 22 between the two darts 42 and 44 to form the two straps 64A and 64B. Each of the straps 64A and 64B includes a generally triangular tab 68 fixedly secured, i.e., sewn, to its free end. Each of the tabs 68 is constructed of the same material as that forming the tabs 48A–48C. The straps 64A and 64D are arranged to provide upward lift and support for the horse's fetlock which is located within the brace at the location of the cup-shaped recess 46.

As mentioned earlier, the brace 22 is designed for use on either of the right side ankles of the horse or either of its left side ankles. Thus, as can be appreciated from the sectional views of FIGS. 2 and 3 and the exploded isometric view of FIG. 6 the panel forming the brace 22 is asymmetrical, i.e., the fetlock receiving recess or pocket 46 is located laterally of the vertical midline of the panel forming the brace. Moreover, as will also be described later, each of the inserts 24A–24C is similarly asymmetrical to be accommodated within the brace 22.

The brace 22 is placed on the horse's ankle with the wider side of the brace, i.e., the side from the vertical midline to the edge 34, being located on the inside of the horse's ankle and with the short side of the brace, i.e., the side from the vertical midline to the edge 36 being located on the outside of the ankle, and with the horse's fetlock 12 being located within the cup-shaped recess 46 in the rear of the brace centered on the vertical midline.

Each of the inserts 24A–24C is also asymmetrical and shaped like the brace 22 to be readily accommodated thereon. Thus, as can be seen in FIG. 7 the insert 24A basically comprises a sheet or panel of a flexible, resilient, good-shock absorbing material. The insert 24A includes an upper edge 70, a lower edge 72 and a pair of marginal vertical side edges 74 and 76. A cup shaped portion 78 is formed in the panel of the insert 24A by means of sewn darts 80 and 82 in a similar manner to that used to form the cup shaped portion 46 of the brace 22. The darts 80 and 82 are also located off center of the vertical midline of the insert 24A like darts 42 and 44.

One particularly good shock absorbing material for the insert 24A is a cellular urethane foam sold by Rogers Corporation of East Woodstock, Conn. under the trademark PORON. This material is available in various densities and durometers so that various levels or degrees of shock absorption can be provided by an appropriately configured insert 24A.

In order to releasably secure the insert 24A onto the inner surface 38 of the brace 22, the insert includes one part of a releasably securable hook and loop attachment system. That one part is in the form of a pair of longitudinally extending flexible strips 84 and 86. In particular, each strip comprises a multi-hook component of a hook and loop, e.g., Velcro®, fastening system. The strip 84 extends along the marginal edge 74 on the rear surface of the insert and is sewn thereto while the strip 76 extends along the marginal edge 76 and is sewn onto the insert. The strips 84 and 86 are arranged to be releasably secured to the other part of the releasably securable hook and loop attachment system. That other part comprises a corresponding pair of strips 88 and 90, which are each preferably multi-loop plush strips of the Velcro® fastening system. These strips are fixedly secured, e.g., sewn, on the inner surface of the brace adjacent the respective marginal edges 34 and 36.

As should be appreciated from the foregoing, the multi-hook strips 84 and 86 and the multi-loop or plush strips 88 and 90 together form the heretofore identified releasably securable attachment means 28.

The insert 24A is arranged to be located so that its cup shaped recess portion 78 fits within the cup shaped recess portion 46 in the brace 22, whereupon the multi-hook component strips 74 and 76 releasably engage the multi-loop components strips 80 and 90, respectively, to hold the insert in position.

Figure 3:
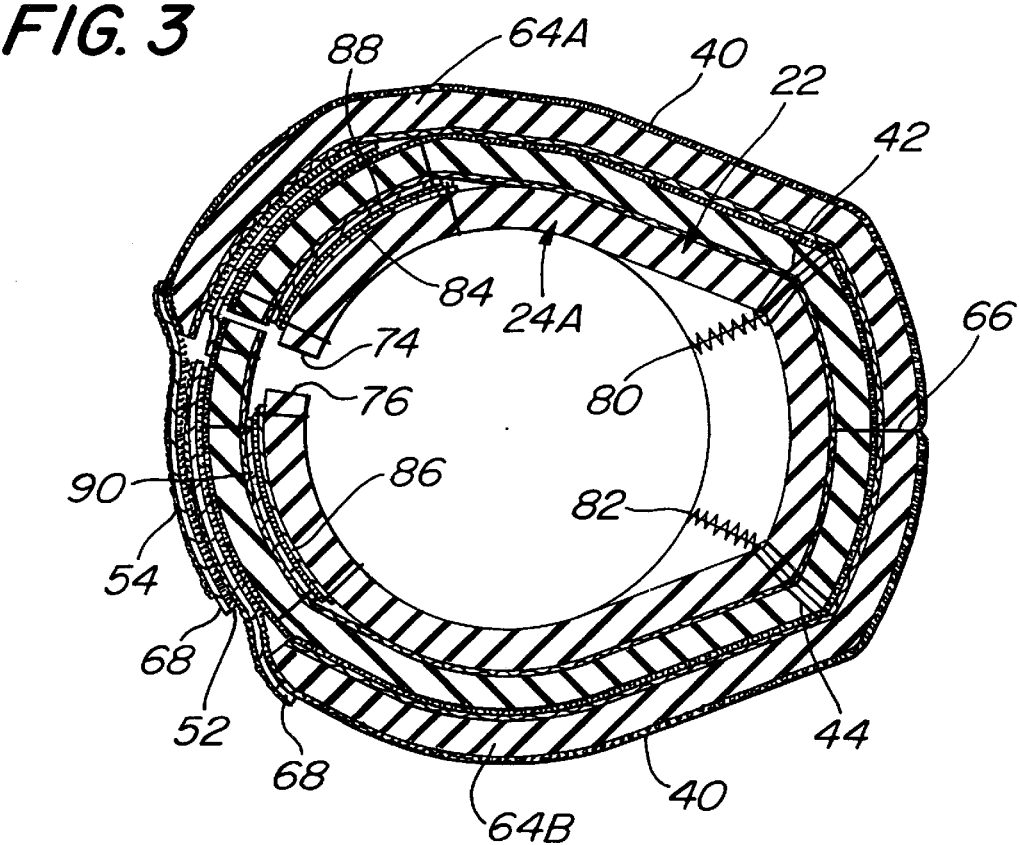
FIG. 3 is an enlarged sectional view of the brace system taken along line 3—3 of FIG. 1.

The brace 22 with the insert 24A is now ready to be wrapped about the ankle of the horse and secured in place by pulling the tabs 48A–48C into engagement with the brace's plush outer surface as described earlier, and then by pulling the straps 56A and 56B into position over the tabs, as also described earlier. The two fetlock supporting straps 64A and 64B are then pulled into engagement with each other and with contiguous plush surfaces 40 of the brace 22 as shown in FIGS. 1 and 3. This completes the mounting of the ankle brace on the horse.

In FIG. 8 the insert 24B is shown. The insert 24D is formed like insert 24A except that insert 24B is formed of a sheet of neoprene having a plush fabric inner surface 92 and smooth fabric outer surface 94. A pair of strips 84 and 86, like those of insert 24A, are secured along the two marginal edges of the insert 24B. The insert 24B, being formed of neoprene, provides an additional layer of a thermal insulation when it is mounted within the brace 22 and the brace is in place on the horse's ankle. Thus, the system 20 with insert 24B provides additional heat retention for the ankle.

In FIG. 10 the insert 24C is shown. This insert is constructed in the same manner as inserts 24A and 24B except for the material forming the panel. To that end, the insert 24C is constructed of a sheet 96 of orthopedic felt. The interstitial spaces between the various fibers forming the felt sheet 96 provide a multitude of air passageways, thereby enabling air to reach the portion of the ankle covered by the brace 22. This arrangement is particularly suitable for applications wherein the horse has a wound at the ankle or on the leg contiguous with the ankle which would be covered by the brace.

It should be pointed out at this juncture that while the inserts 24A–24C as shown and described heretofore are each constructed so that they are the same shape, that is, a shape corresponding to the shape of the brace 22. This arrangement is not exclusive. Thus, the system 20 of this invention can make use of an insert of various shapes, depending upon the function the insert is to achieve, as long as it is releasably securable to the brace body.

It should be pointed out that the brace system of the subject invention is designed to accommodate a wide range of sizes of ankles. However, the braces and inserts may have to come in some different sizes to accommodate all different sizes of horses' ankles. Depending on the specific anatomy of the ankle and contiguous leg portion, there may be some overlap (not shown) of the vertical marginal edges of the brace at the top of the brace.

As should be appreciated from the forgoing the subject invention enables one to readily change inserts to suit particular condition or application. For example, in uses under hard riding conditions a more shock absorbent insert, i.e., insert 24A, can be provided in the brace than the insert 24B, to ensure against injury. Moreover, with the subject invention, one need not buy shipping boots to use on the horse's ankles when trailering the horse since braces of the subject invention can utilize an insert within a brace to provide good protection for the ankle from injury during transport.

By virtue of the cross-over strapping arrangement, i.e, the one group of straps overlooking or overlying the other group of straps, a good secure closure system is provided, which is more resistant to accidental disconnection than prior art neoprene braces including Velcro® component straps used heretofore for human beings, as well as those used for horses as identified above. Moreover, the straps which lift and support the fetlock also serve to provide a customized fit to the needs of the horse and conditions by virtue of their adjustability.

Without further elaboration the foregoing will so fully illustrate my invention that others may, by applying current or future knowledge, adopt the same for use under various conditions of service.

What is claimed is:

1. An equine ankle brace system comprising a brace arranged to be wrapped about the ankle of a horse, and at least one treatment insert arranged to be releasably secured to said brace, said brace comprising a panel of a resilient thermally insulating, heat retaining material having a cup-shaped bottom portion for enabling said panel to be bent around and closely conform to the horse's ankle and contiguous portions of the horse's lower leg, said panel having an inner surface and an outer surface and releasably securable mounting strap means coupled to said panel to enable said panel to be bent about the horse's ankle to closely conform to the ankle and to be held in position thereon, said brace having first releasable securement means on portions of the inner surface of said panel, said at least one treatment insert having a cup-shaped bottom portion to accommodate the horse's fetlock and being formed of a material arranged to produce a beneficial effect on the horse's ankle, said insert having second releasable securement means fixedly secured to said insert to enable said insert to be releasably secured to said brace for location between said brace and the horse's ankle.

2. The ankle brace system of claim 1 wherein said resilient thermally insulating, heat retaining material comprises neoprene rubber.

3. The ankle brace system of claim 1 wherein said insert is a shock absorbing pad.

4. The ankle brace system of claim 3 wherein said shock absorbing pad is formed of a cellular foam.

5. The ankle-brace system of claim 1 wherein said panel is a one-piece member arranged to be wrapped about the horse's ankle and contiguous portions of the horse's lower leg.

6. The ankle brace system of claim 1 wherein said insert comprises an air-pervious material.

7. The ankle brace system of claim 6 wherein said air-pervious material is formed of felt.

8. The ankle brace system of claim 6 wherein said pad includes a cup shaped bottom portion for enabling the panel to conform to the horse's ankle and contiguous portions of the horse's lower leg.

9. The ankle brace system of claim 6 wherein said pad includes a cup shaped bottom portion for enabling the panel to conform to the horse's ankle and contiguous portions of the horse's lower leg.

10. The ankle brace system of claim 1 wherein said insert is a thermally insulating, heat-retaining pad.

11. The ankle brace system of claim 10 wherein said thermally insulating, heat retaining pad is formed of neoprene rubber.

12. The ankle brace system of claim 1 wherein said panel comprises a pair of longitudinal edges which are arranged to be brought proximate each other when said panel is wrapped about the horse's ankle, said releasable securable mounting strap means comprises a first group of plural straps secured to said outer surface of said panel adjacent one of said longitudinal edges for releasable engagement with portions of said panel adjacent the other of said longitudinal edges.

13. The ankle brace system of claim 12 wherein said releasably securable mounting strap means comprises second group of plural straps secured to said outer surface of said panel adjacent the other of said longitudinal edges for releasable engagement with portions of said panel adjacent said one of said longitudinal edges.

14. The ankle brace system of claim 13 wherein said releasably securable strap mounting means additionally comprises a third group of plural straps secured to said panel at said cup shaped lower portion thereof and including portions to be extended upward and releasably secured to the panel to provide support for the horse's fetlock.

15. The ankle brace system of claim 1 wherein said releasably securable strap means additionally comprises a pair of third straps secured to said panel at said cup shaped lower portion thereof and including portions to be extended upward and releasably secured to the panel to provide support for the horse's fetlock.

16. An equine ankle brace comprising a brace arranged to be wrapped about the ankle of a horse, said brace comprising a panel of a resilient material and at least one connector member for holding said brace in place on the ankle of the horse, said panel having a cup-shaped bottom portion for enabling said panel to conform to the horse's ankle and contiguous portions of the horse's lower leg and with the horse's fetlock being located within said cup shaped bottom portion, said cup shaped bottom portion having a mid-line, said brace including a pair of resilient straps secured to said cup shaped portion of said panel and extending on opposite sides of said mid-line to extended over and be secured to other portions of said panel to provide lift and support for the horse's fetlock.

17. The equine ankle brace of claim 16 wherein said panel is formed of a thermally insulating, heat retaining resilient material.

18. The equine ankle brace of claim 17 additionally comprising at least one treatment insert for producing a beneficial effect on the horse's ankle and which is arranged to be releasably mounted within said panel on said inner surface thereof.

19. The equine ankle brace of claim 18 wherein said insert includes a cup shaped bottom portion adapted to receive the horse's fetlock therein.

20. The equine ankle brace of claim 16 wherein said panel comprises an outer surface, an inner surface, and a pair of longitudinal edges which are arranged to be brought proximate each other when said panel is wrapped about the horse's ankle, said at least one connector member comprising a first group of plural straps secured to said outer surface of said panel adjacent one of said longitudinal edges for releasable engagement with portions of said panel adjacent the other of said longitudinal edges.

21. The equine ankle brace of claim 20 wherein each of said first group of plural straps includes a free end portion including releasably securable fastening means for securing said free end portion of said first group of straps to desired positions on said brace.

22. The equine ankle brace of claim 16 additionally comprising at least one treatment insert for producing a beneficial effect on the horse's ankle and which is arranged to be releasably mounted within said panel on said inner surface thereof.

23. The equine ankle brace of claim 22 wherein said insert includes a cup shaped bottom portion adapted to receive the horse's fetlock therein.

24. The equine ankle brace of claim 16 wherein each of said straps is formed of a thermally insulating, heat retaining resilient material.

25. The equine ankle brace of claim 16 wherein each of said straps includes a free end portion including releasably securable fastening means for securing said free end portion of said straps to desired positions on said brace.

\* \* \* \* \*